(12) United States Patent
Thomas et al.

(10) Patent No.: US 11,565,445 B2
(45) Date of Patent: Jan. 31, 2023

(54) ARTICULATING CRACK CURING LAMP AND METHOD

(71) Applicant: MONDOFIX INC., Blainville (CA)

(72) Inventors: Jonathan P. Thomas, Maple Lake, MN (US); Levi R. Nellen, Roseville, MN (US); Penny M. Chatterton, Shakopee, MN (US)

(73) Assignee: MONDOFIX INC.

( * ) Notice: Subject to any disclaimer, the term of this patent is extended or adjusted under 35 U.S.C. 154(b) by 363 days.

(21) Appl. No.: 16/755,236

(22) PCT Filed: Oct. 11, 2018

(86) PCT No.: PCT/CA2018/051281
§ 371 (c)(1),
(2) Date: Apr. 10, 2020

(87) PCT Pub. No.: WO2019/071350
PCT Pub. Date: Apr. 18, 2019

(65) Prior Publication Data
US 2020/0238577 A1 Jul. 30, 2020

Related U.S. Application Data

(60) Provisional application No. 62/571,045, filed on Oct. 11, 2017.

(51) Int. Cl.
  B29C 35/08 (2006.01)
  B29C 73/24 (2006.01)
  B29L 31/30 (2006.01)

(52) U.S. Cl.
  CPC .......... B29C 35/0805 (2013.01); B29C 73/24 (2013.01); *B29C 2035/0827* (2013.01); *B29L 2031/3052* (2013.01)

(58) Field of Classification Search
  CPC ................ B29C 35/0805; B29C 73/24; B29C 2035/0827
  See application file for complete search history.

(56) References Cited

U.S. PATENT DOCUMENTS 5,565,217 A  10/1996  Beckert et al.
5,776,506 A   7/1998  Thomas et al.
(Continued)

FOREIGN PATENT DOCUMENTS

CN   205101931 U  *  3/2016
JP     07285374 A  * 10/1995
WO   2015/079124 A1   6/2015

OTHER PUBLICATIONS

International Search Report and Written Opinion for PCT/CA2018/051281, dated Jan. 15, 2019.
(Continued)

*Primary Examiner* — Daniel McNally
(74) *Attorney, Agent, or Firm* — Merchant & Gould P.C.

(57) ABSTRACT

A curing lamp apparatus mounts to a work surface with a suction cup. A base is mounted to the suction cup and defines a hinge point for a first bar. At a distal end of the first bar, a second bar is hingedly mounted to the first bar. A first lamp element is hingedly mounted to one end of the second bar. A second lamp element is hingedly mounted to a second end of the second bar. The first and second lamp elements are positionable in a variety of positions to follow the path of a crack in a surface to be repaired. The lamp elements are also foldable into a storage position.

16 Claims, 21 Drawing Sheets

(56) References Cited

U.S. PATENT DOCUMENTS

| | | |
|---|---|---|
| D400,218 S | 10/1998 | Thomas |
| 6,139,300 A | 10/2000 | Thomas et al. |
| 6,302,670 B1 | 10/2001 | Thomas et al. |
| 7,131,752 B2 | 11/2006 | Beveridge et al. |
| 8,822,961 B2 | 9/2014 | Thomas et al. |
| 9,051,208 B2 | 6/2015 | Thomas et al. |
| 2006/0104069 A1* | 5/2006 | Beveridge ............... B29C 73/34 362/397 |
| 2013/0251831 A1 | 9/2013 | Thomas et al. |

OTHER PUBLICATIONS

Extended European Search Report for Application No. 18866441.1 dated Jun. 4, 2021.

\* cited by examiner

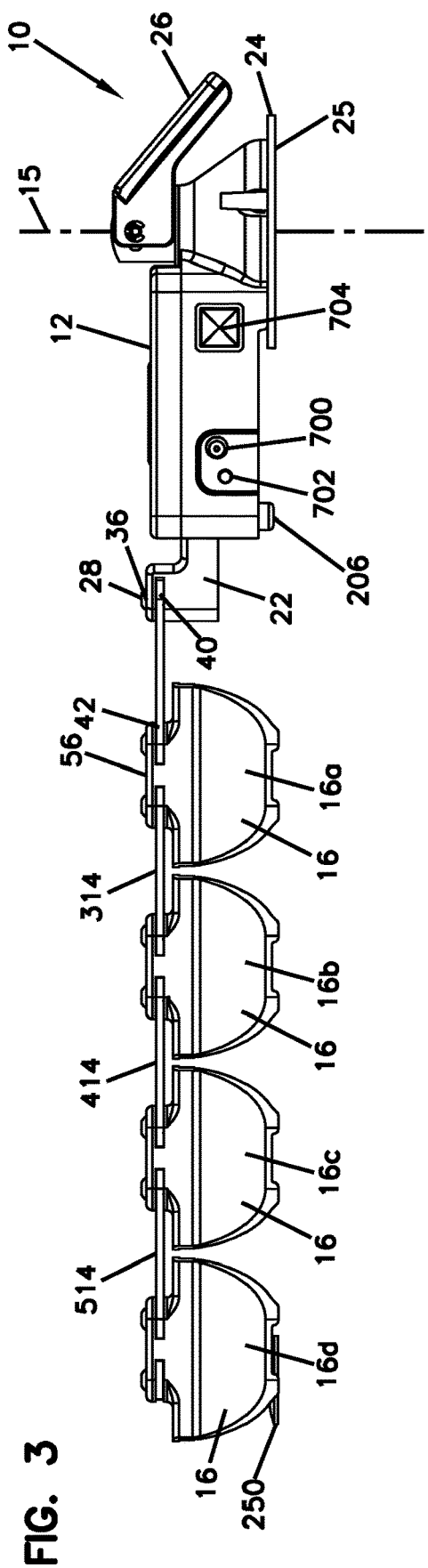
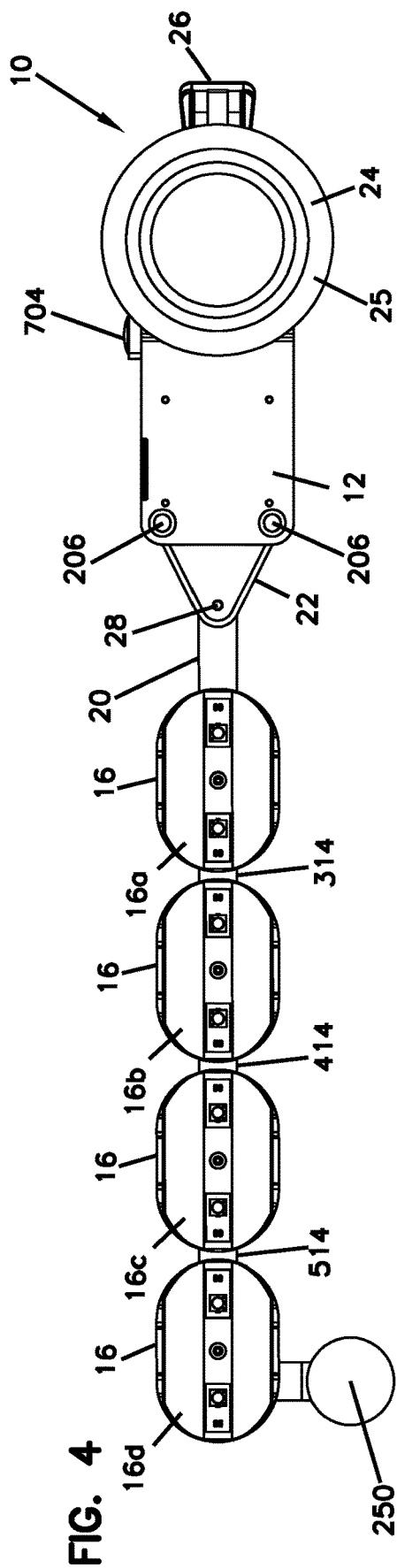

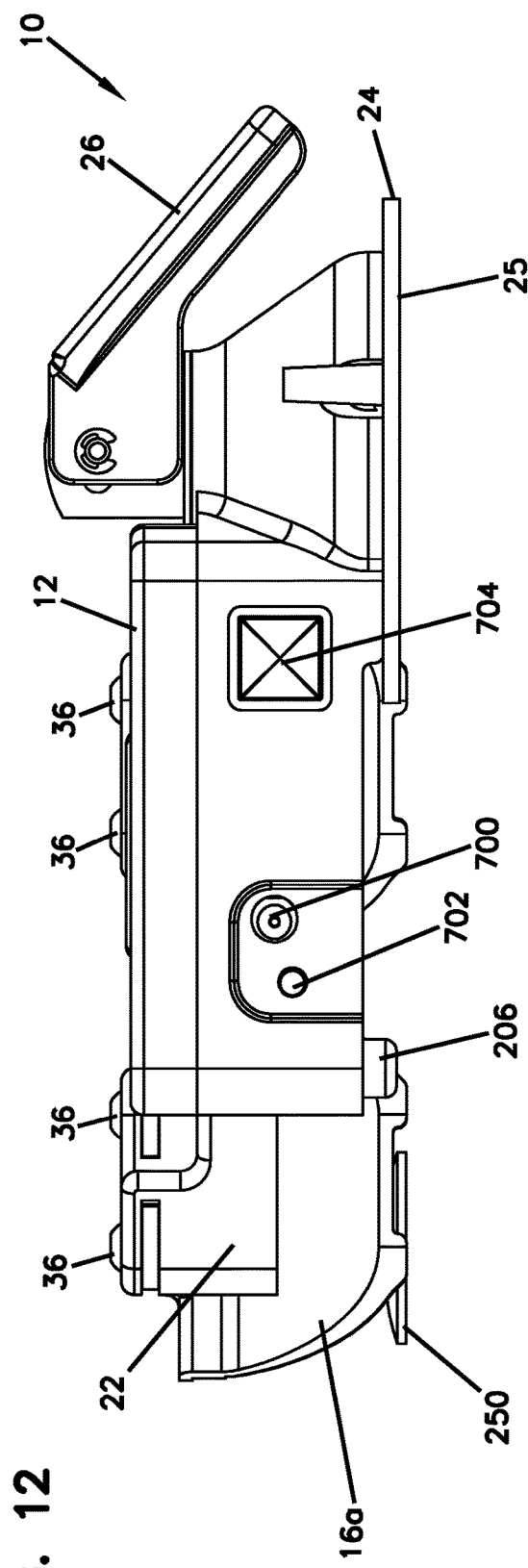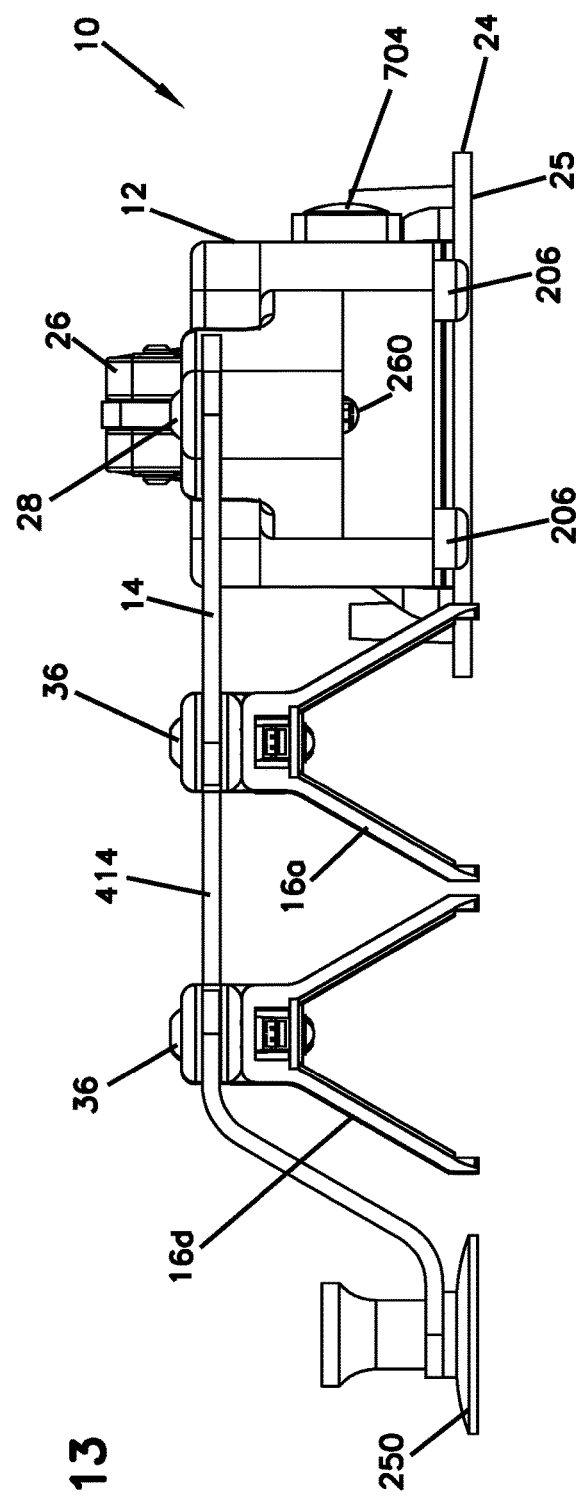

ARTICULATING CRACK CURING LAMP AND METHOD

This application is a National Stage Application of PCT/CA2018/051281, filed Oct. 11, 2018, which claims the benefit of priority to U.S. Provisional patent application Ser. No. 62/571,045, filed Oct. 11, 2017, the entire disclosure of which is incorporated by reference in their entireties. To the extent appropriate, a claim of priority is made to each of the above disclosed applications.

FIELD OF THE INVENTION

The present invention relates to curing lamps for curing repair material used to repair cracks in windshields or other glass or plastic materials.

BACKGROUND OF THE INVENTION

When a windshield or other glass or plastic material becomes cracked, a resin or other repair material can be used to repair the crack. Various repair bridges or devices with resin injectors are known for applying repair resin to the crack including devices shown in U.S. Pat. Nos. 5,565,217; 5,776,506; 6,139,300 and 6,302,670.

Often the repair material needs to be cured with an ultraviolet light source. Lamps including a UV light source are known which are positioned adjacent to the windshield or other surface, close to the crack to cure the repair material positioned in the crack.

Various concerns exist with respect to curing lamps. Typically, cracks are cured on site, so the repair technician needs to be able to transport all necessary equipment to the location of the windshield or other material to be repaired. Also, the repair technician is desirous of repairing the crack in an efficient manner with good results. Many times the lamp is not as long as the crack to be repaired. Typically, the lamp is moved along the crack to cure the resin along the crack. A lamp which is too small may not cover enough area over the crack to be efficient for the technician. Conversely, a lamp which is too large is wasteful, may not follow the path of the crack, and may be difficult to transport. If the lamp is not appropriately placed over the repair material, the material may not properly cure. One existing lamp is shown in U.S. Pat. No. 7,131,752.

There is a need for further improvements with respect to curing lamps.

SUMMARY OF THE INVENTION

The present invention includes a curing lamp apparatus for mounting to a work surface including a suction cup engageable with the work surface, and a base mounted to the suction cup. Attached to the base is one or more lamp segments or elements. If more than one lamp element is provided, the lamp elements are arranged in a line, with a first lamp element connected to the base, and the first lamp element and any other lamp elements moveable relative to each other for placement over a crack to be repaired.

One, two, three, four or more lamp elements are provided. A first bar or arm is hingedly mounted to the base and includes a distal end extending away from the base. A first lamp element is hingedly mounted at the distal end of the first bar. One or more further lamp elements are hingedly connected to each other in a line. The further lamp elements are moveable relative to each other for closely following the pathway of a crack in the work surface to be repaired.

A further aspect of the present invention relates to a curing lamp apparatus for mounting to a work surface wherein a plurality of lamp elements are each hingedly mounted to each other in a line extending from an end of a base mountable to a work surface with a suction cup.

Another aspect of the invention is to include a further suction cup at a distal end of the lamp element or line of elements.

Another aspect of the present invention relates to a method of using a curing lamp apparatus including the steps of mounting a base of the lamp apparatus to a surface to be repaired, rotating a first lamp element of the lamp apparatus relative to a base to position the first lamp element over a first portion of a crack in the surface, and rotating a second lamp element of the lamp apparatus relative to the first lamp element to position the second lamp element over a second portion of the crack in the surface. The method preferably includes rotating further lamp elements in a line relative to the base to follow the pathway of a crack in the work surface to be repaired.

A further method relates to positioning the lamp element or elements over the crack, rotating the lamp element(s) away from the crack for inspection or repair, then rotating the lamp element(s) over the crack for curing of the repair material.

The lamp apparatus and method of the present invention further concerns a folding lamp apparatus with a plurality of lamp elements separately hinged in a line, and with the lamp apparatus being mountable to the surface to be repaired.

On the top of each lamp element are pivot joints that are connected by links and a fastener at each pivot joint. These pivot joints are tightened to have enough tension so that the segments can be adjusted and remain in the position in which each is arranged. The segment positions are arranged to follow the shape of the crack to be repaired.

BRIEF DESCRIPTION OF THE DRAWINGS

FIG. 3 is a side view of the curing lamp apparatus of FIG. 1.

FIG. 4 is a bottom view of the curing lamp apparatus of FIG. 1.

FIG. 12 is a first side view of the curing lamp apparatus in the storage position.

FIG. 13 is a second side view of the curing lamp apparatus in the storage position.

DETAILED DESCRIPTION OF THE PREFERRED EMBODIMENT

Figure 1:
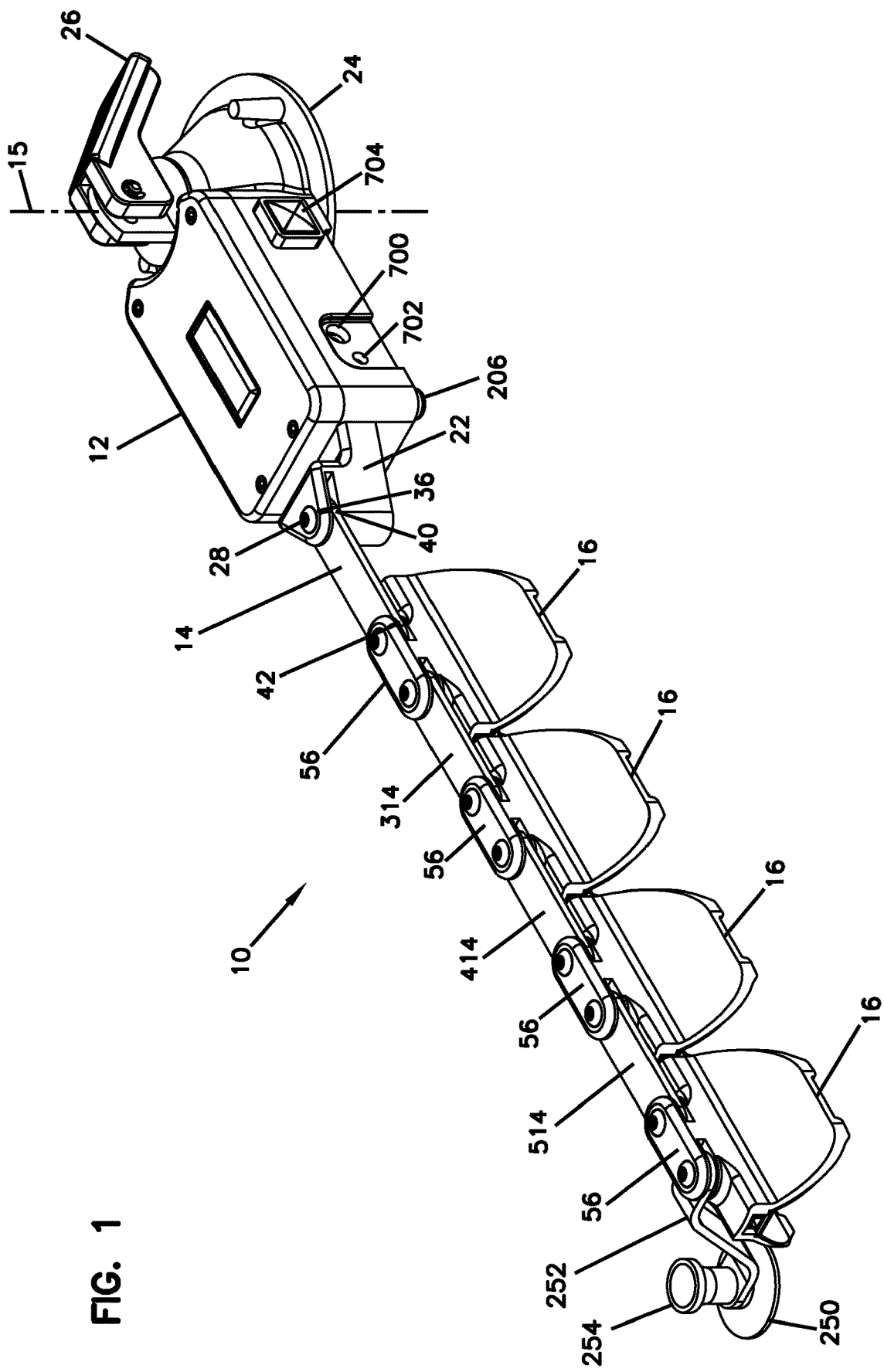
FIG. 1 is a top perspective view of a curing lamp apparatus in accordance with one embodiment of the present invention with the lamp elements extending in a straight line direction.
Figure 2:
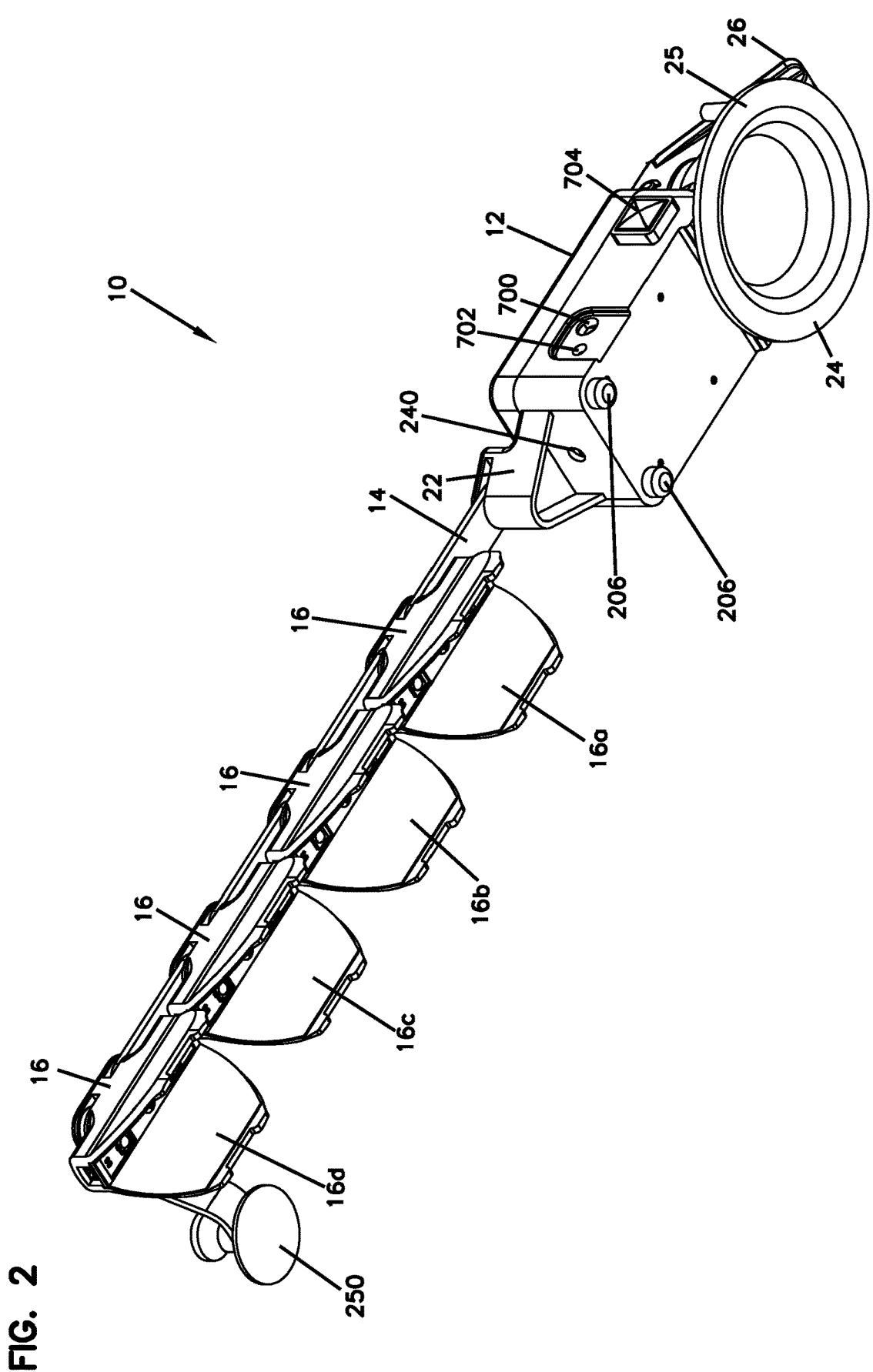
FIG. 2 is a bottom perspective view of the curing lamp apparatus of FIG. 1.
Figure 5:
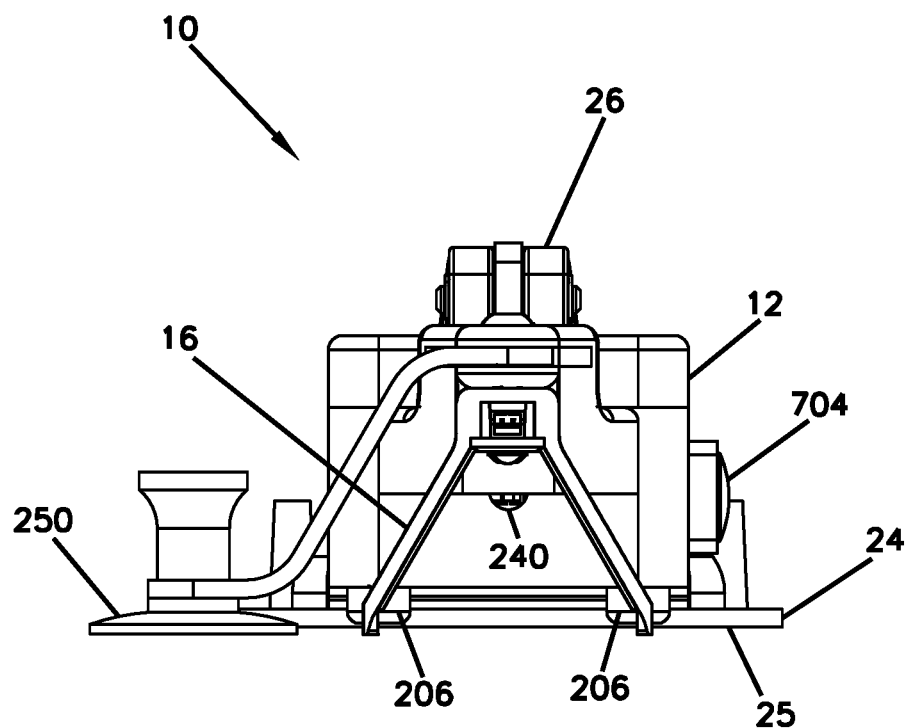
FIG. 5 is an end view of the curing lamp apparatus of FIG. 1.

Referring now to FIGS. 1-5 and 14, a lamp apparatus 10 in accordance with one preferred embodiment of the present invention is shown. Lamp apparatus 10 includes a base 12 including a first suction cup 24 used for mounting lamp apparatus 10 to a windshield or other surface 11 to be repaired. Extending from base 12 is an arm 14 having a distal end 42 including at least one lamp element 16. In the preferred embodiment, two or more lamp elements 16 are provided. As shown four lamp elements 16a, 16b, 16c, 16d are shown.

Each lamp element 16 projects ultraviolet (UV) light onto the windshield 11. Lamp apparatus 10 and the UV light it provides is used to cure repair material positioned in a crack 13 in windshield 11. One UV source is LED bulbs.

Base 12 includes a mount 22 for defining a first hinge point 28 between base 12 and arm 14. Arm 14 can be pivotally moved relative to base 12 about first hinge point 28. Tensioning fastener 36 allows arm 14 to be clamped or held more tightly or less tightly to base 12 to control the ease of rotation. Tension in the hinge mount can be adjusted through the use of a screwdriver or other tool. Enough tension is desired so that the lamp elements 16 generally stay in the position placed by the user.

Arm 14 is in the form of a first bar extending from a proximal end 40 adjacent to base 12 to a distal end 42. First lamp element 16a includes a second bar 56 connected at proximal end 57 to distal end 42 of arm 14. Distal end 42 of first bar 14 and proximal end 57 of second bar 56 define a second hinge point 230 for lamp apparatus 10. A distal end 58 of second bar 56 is hingedly mounted to a proximal end 60 of another arm 314. Tensioning fasteners 36 allows arms 14, 314 to be clamped or held more tightly or less tightly to first lamp element 16a to control the ease of rotation.

Figure 14:
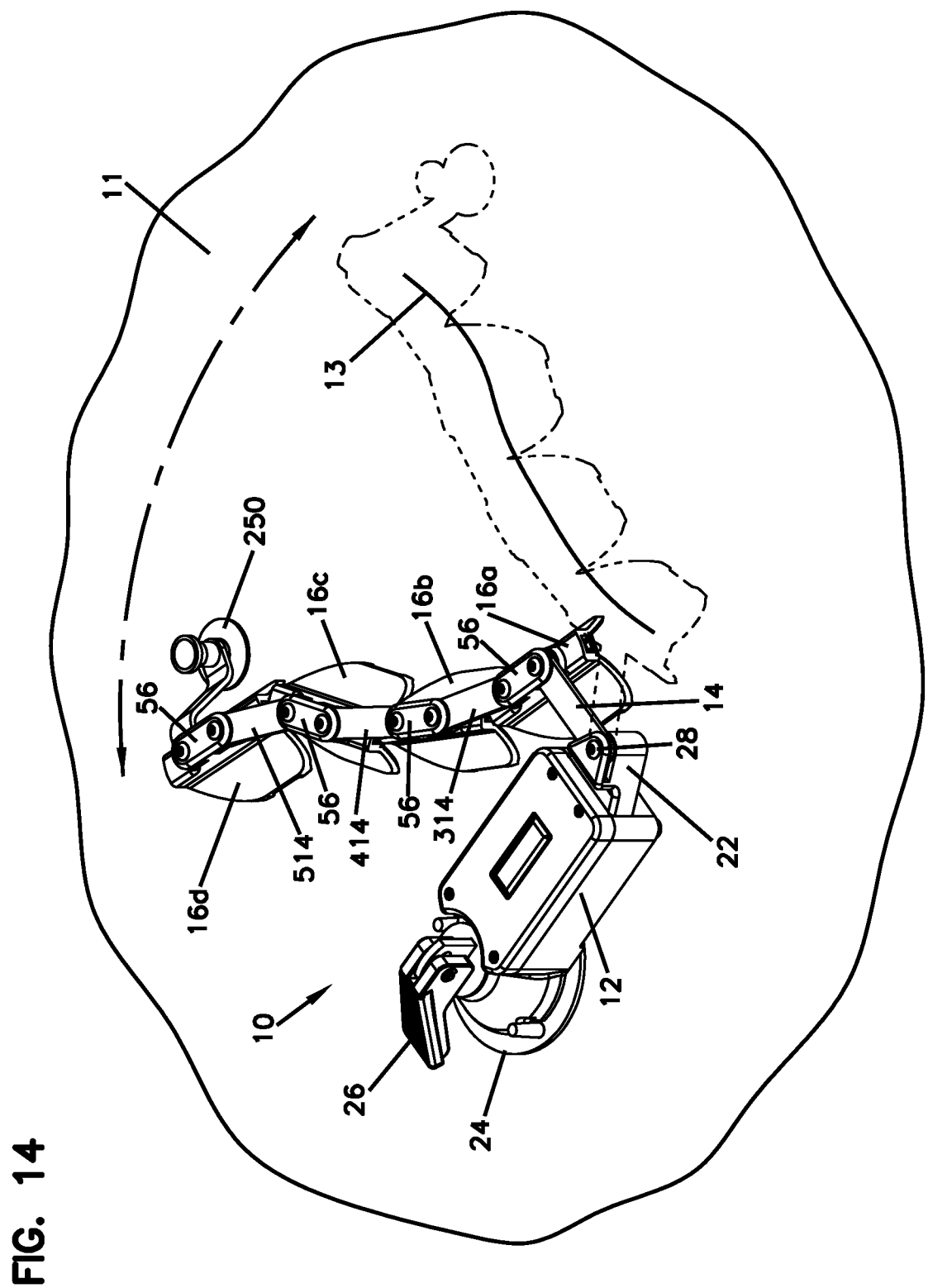
FIG. 14 is a perspective view of a curing lamp apparatus in accordance with one embodiment of the present invention mounted on a windshield over a crack.
Figure 15:
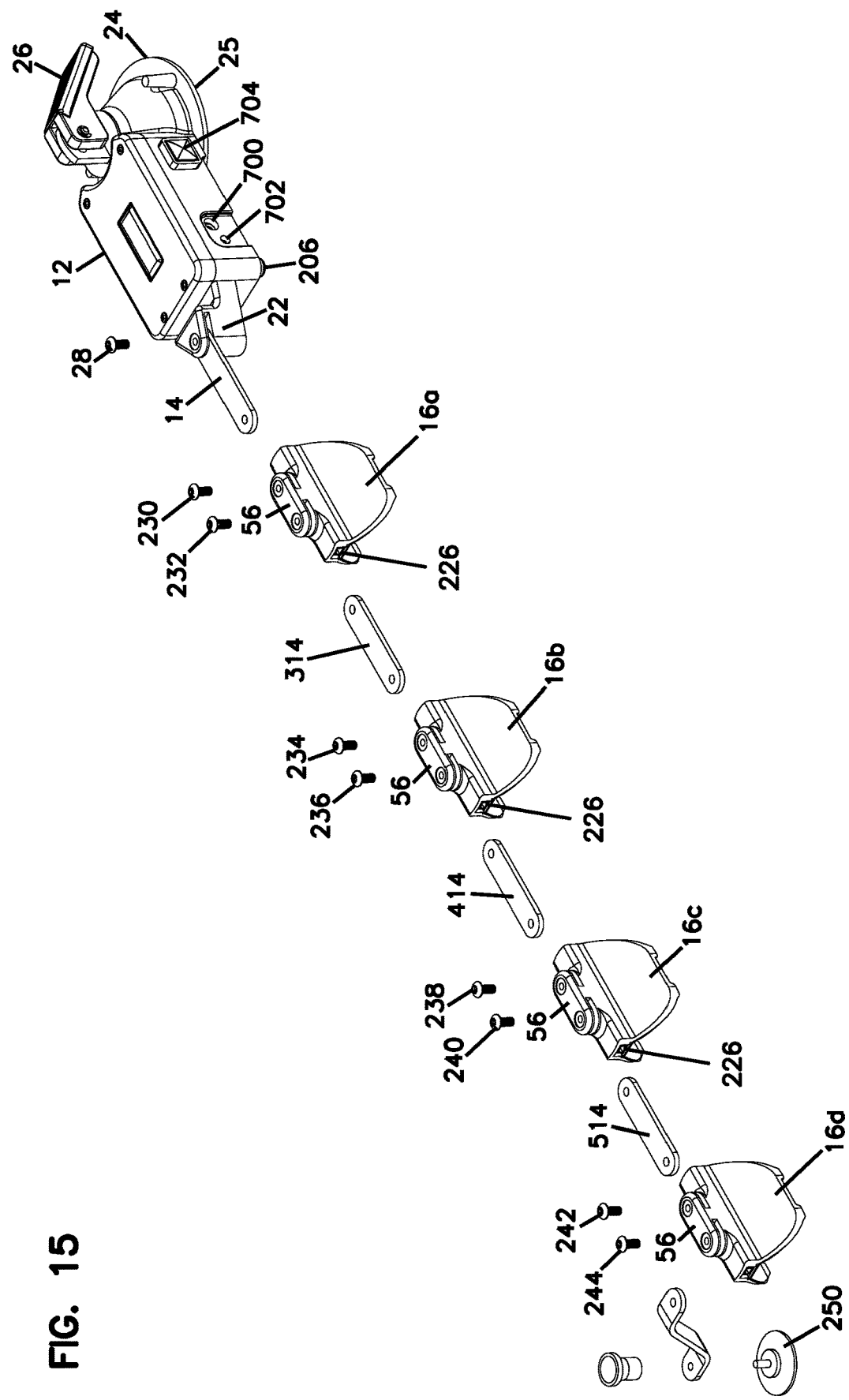
FIG. 15 is an exploded view of the curing lamp apparatus of FIG. 1.
Figure 16:
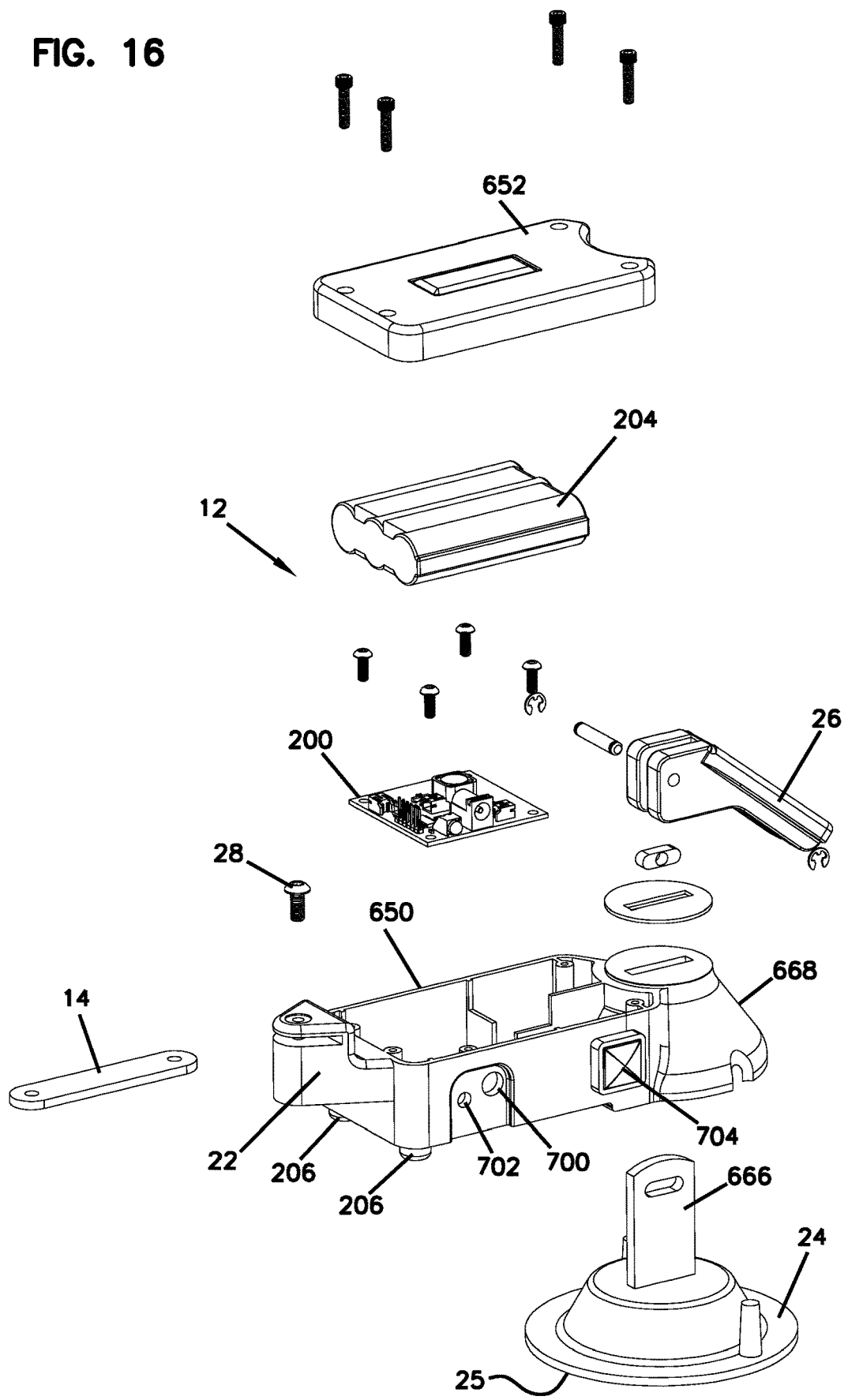
FIG. 16 is an exploded view of the suction cup and base of the curing lamp apparatus of FIG. 1.
Figure 17:
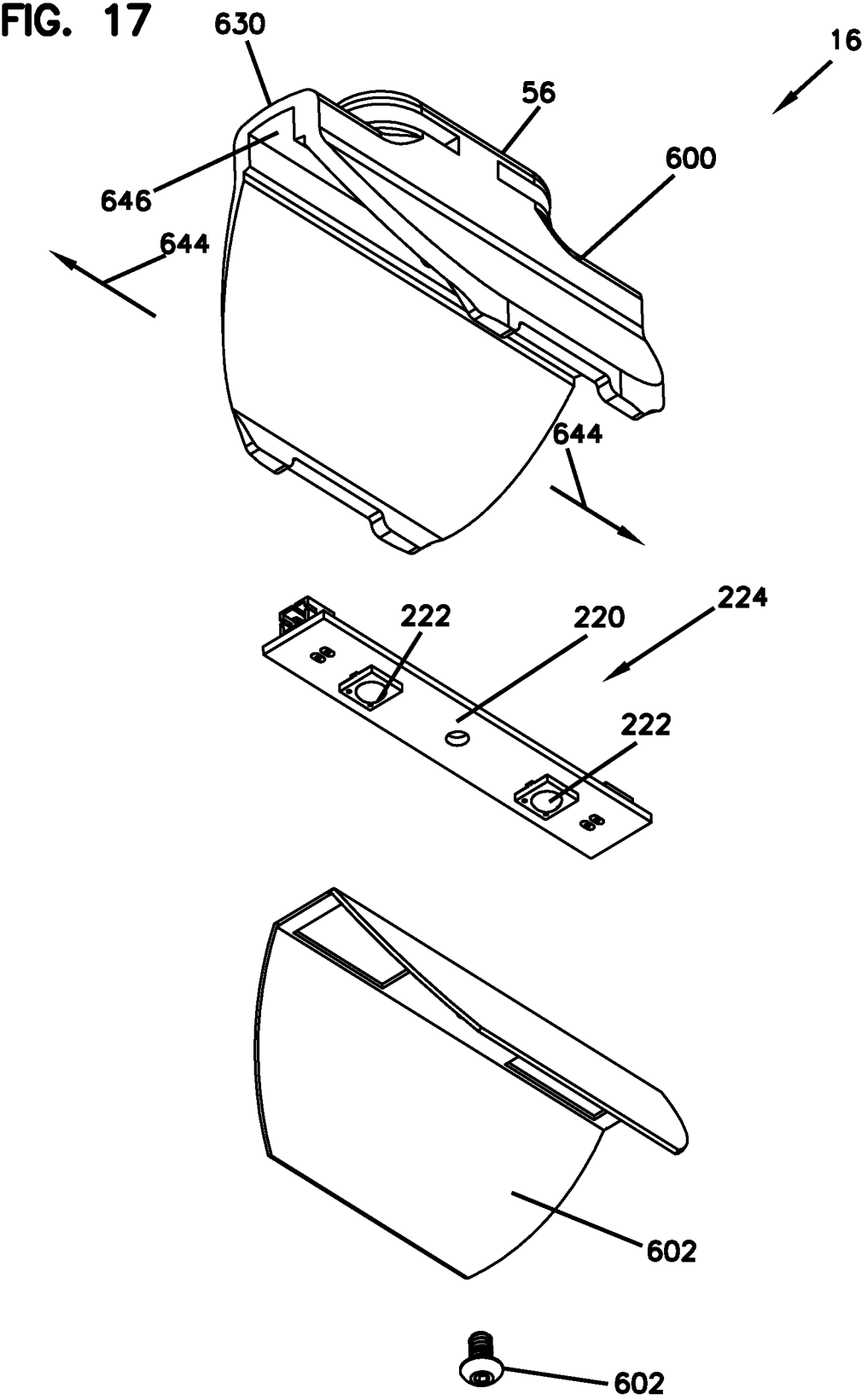
FIG. 17 is an exploded view of one of the lamp elements of the curing lamp apparatus of FIG. 1.
Figure 18:
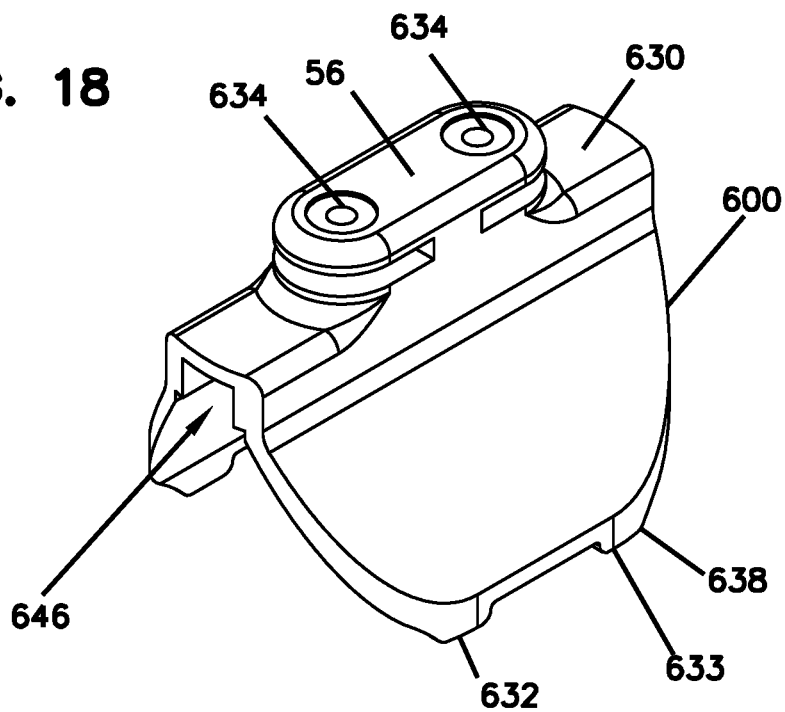
FIG. 18 is a top perspective view of the lamp housing.
Figure 19:
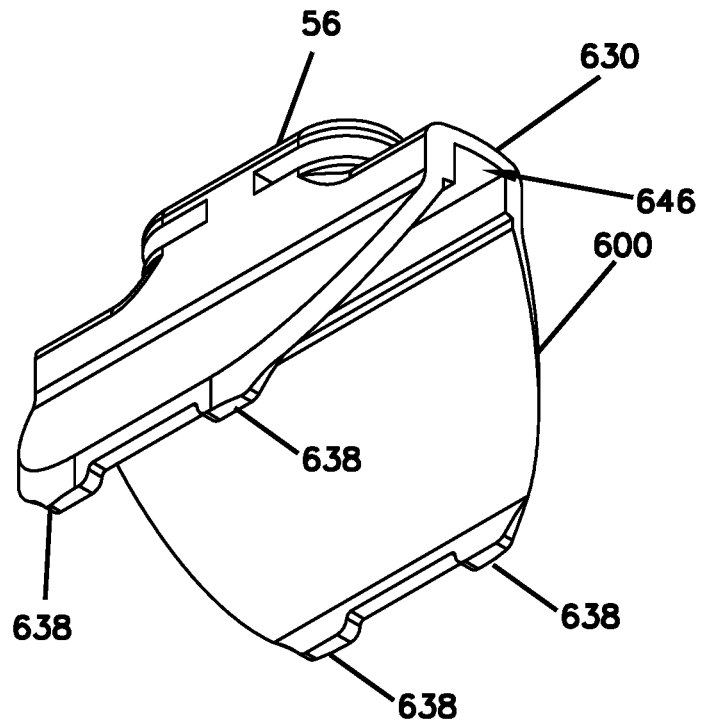
FIG. 19 is a bottom perspective view of the lamp housing.
Figure 20:
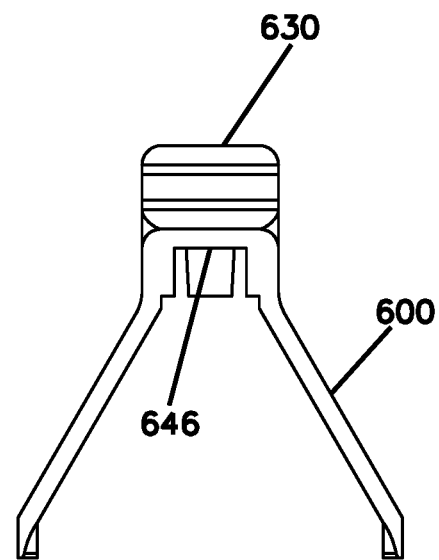
FIG. 20 is an end view of the lamp housing, with an opposite end view being identical.
Figure 21:
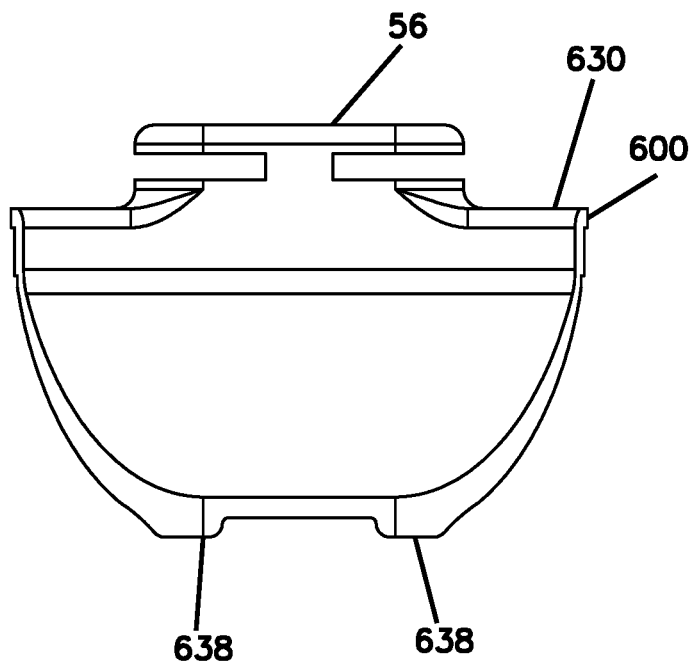
FIG. 21 is a first side view of the lamp housing.
Figure 22:
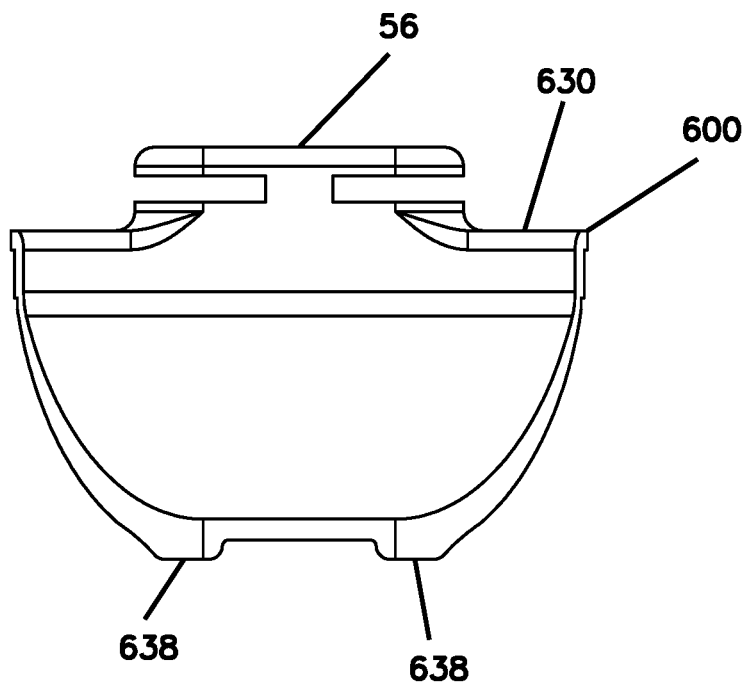
FIG. 22 is a second side view of the lamp housing.
Figure 23:
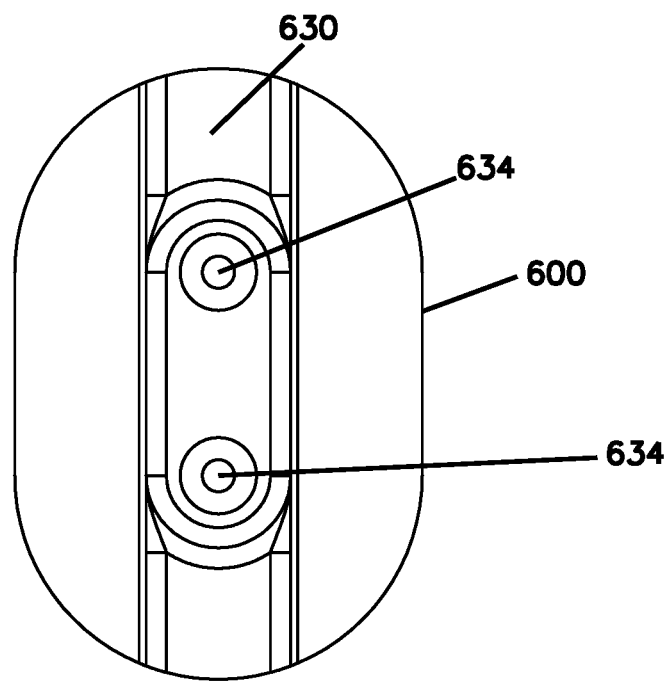
FIG. 23 is a top view of the lamp housing.
Figure 24:
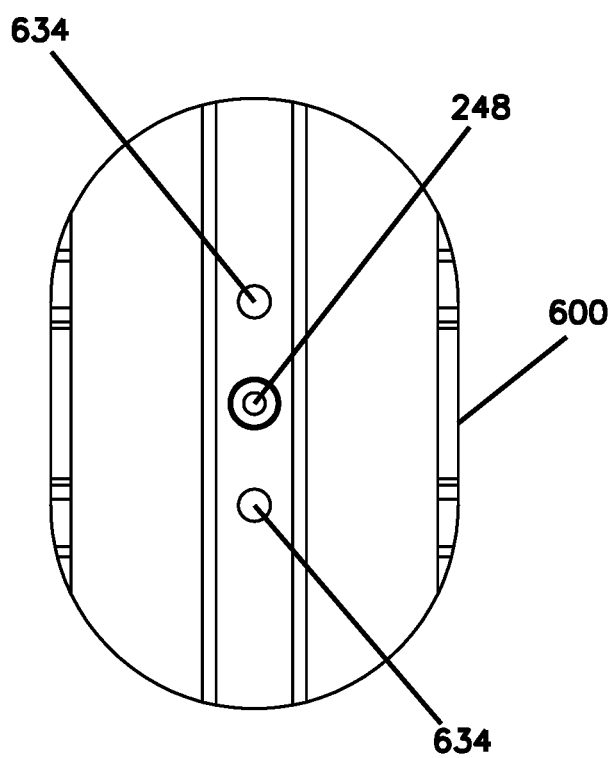
FIG. 24 is a bottom side view of the lamp housing.
Figure 25:
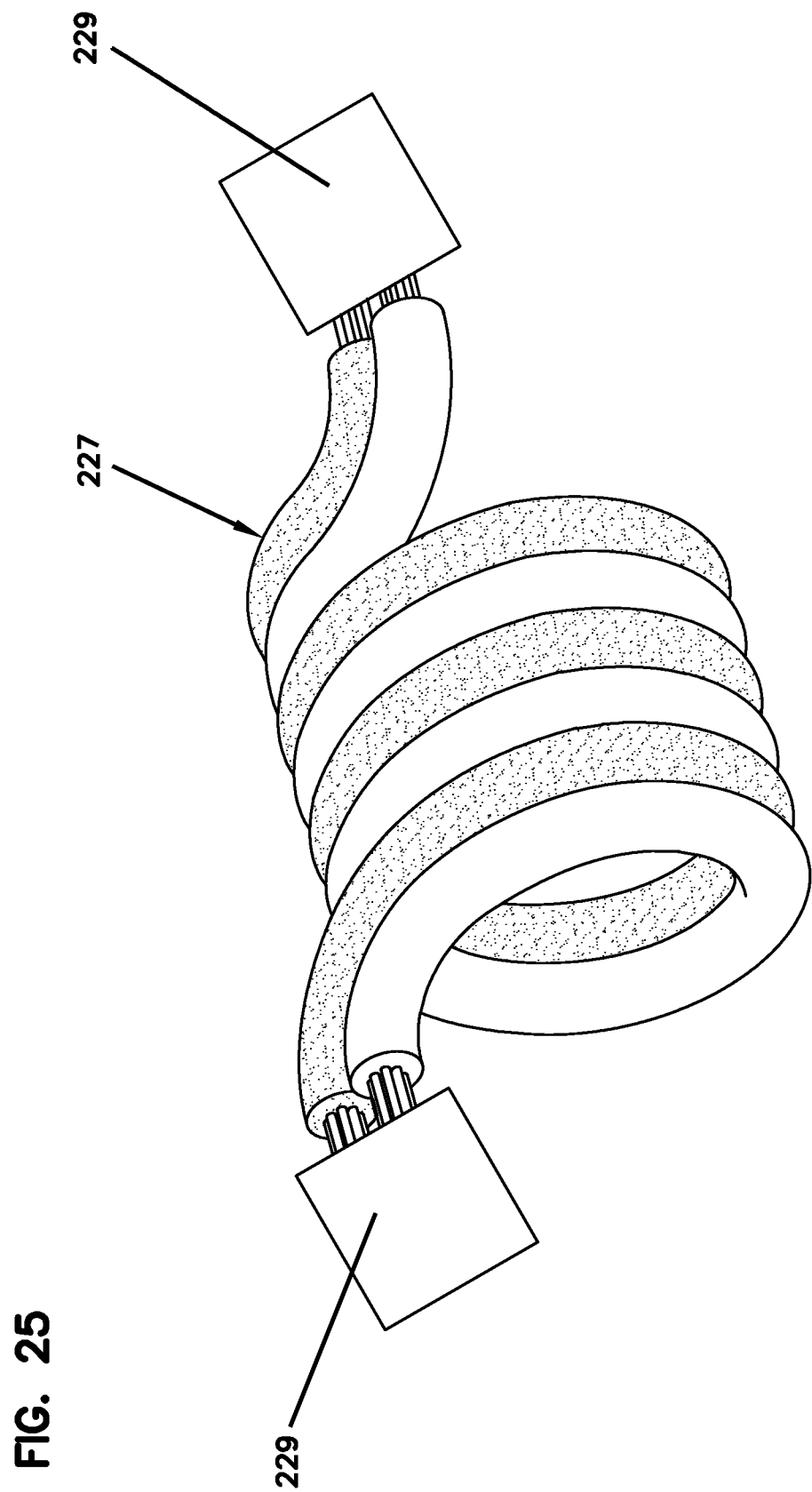
FIG. 25 is a flexible two-wire assembly with connector plugs at both ends for connecting lamp elements.

First bar 14 is moveable about first hinge point 28 as shown. First hinge point 28 defines a hinge axis 29 perpendicular to lower suction cup surface 25. Lower suction cup surface 25 is perpendicular to longitudinal axis 15, which is perpendicular to windshield 11 as shown in FIG. 14.

Further lamp elements 16b, 16c, and 16d are connected to each other with arms or bars 414 and 514, respectively. Lamp elements 16a-d are similarly constructed. Arms 14, 314, 414, 514 are similarly constructed. Hinge points 232, 234, 236, 238, 240, 242, and 244 are each defined by tensioning fasteners 36, and further each define respective hinge axes parallel to longitudinal axis 15.

In the preferred embodiment, lamp apparatus 10 includes the example movements and positions illustrated in FIGS. 6-8 and 14 in order to provide more flexibility for positioning lamp elements 16 over a variety of shapes for crack 13 in windshield 11.

Each lamp element 16a-d is pivotally moveable about respective hinge points as shown. Lamp elements 16a-d move independently in the preferred embodiment. Lamp elements 16a-d pivot about respective first and second hinge axes which are all parallel to longitudinal axis 15. In this manner, a variety of positions for lamp elements 16 are possible in order to more closely follow a variety of different crack shapes.

Lamp elements 16a-d include a main V-shaped housing 600 including an upper surface 630 defining fastener openings 634 for the tensioning fasteners 36 to join to the arms. Bottom surface 635 of lamp housing 100 defines a V- or U-shaped opening 636 to allow light to project on to the surface to be cured. Small rounded feet 638 on lower edges 633 of bottom surface 635 engage the surface to be repaired. Open ends 644 of lamp housing 100 are provided so as to not obstruct light extending from bulbs 112 adjacent to the open ends 644.

Main housing 600 includes a longitudinal channel 646 for receiving a PC board assembly 224 and a hole 248 for a fastener 270.

The base 12 of lamp apparatus 10 includes a main or driver circuit board 200, a switch 202, and a battery 204. The base 12 includes two bumpers 206 for engaging the windshield 11. The lamp elements 16a-d are pivotally mounted to one another in a line to allow for multiple relative positions so as to allow for the lamp outputs to be positioned closely to a crack on a windshield that may take many shapes, including linear, or curved.

FIGS. 1-5 show lamp apparatus 10 is a straight line for repairing a straight line crack.

Figure 6:
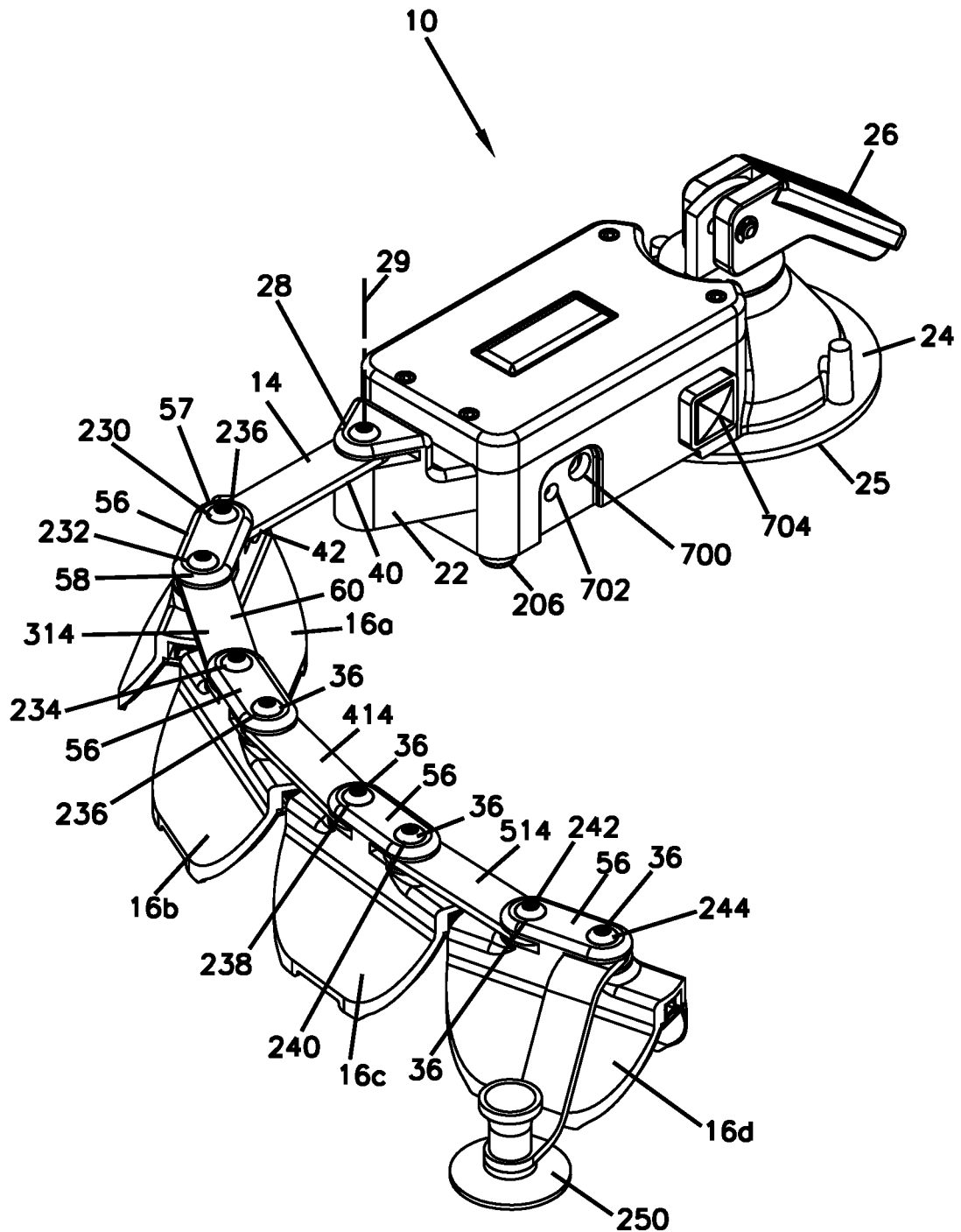
FIG. 6 is a top perspective view of the curing lamp apparatus of FIG. 1 in a first curved linear position.
Figure 6A:
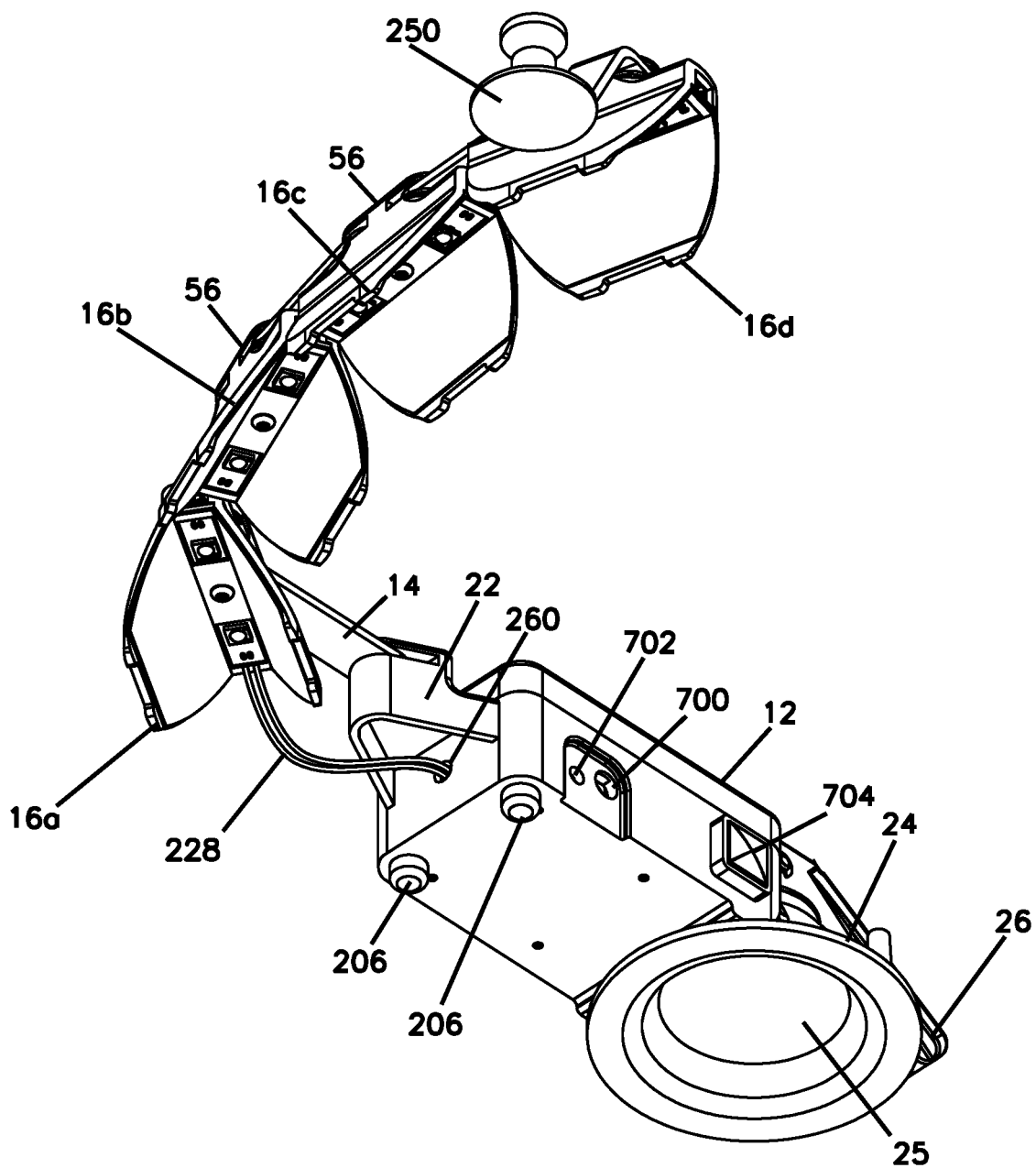
FIG. 6A is a bottom perspective view of the curing lamp apparatus of FIG. 6 in the first curved linear position.

FIG. 6 shows lamp apparatus 10 in a first curved linear position for repairing another curved crack.

Figure 7:
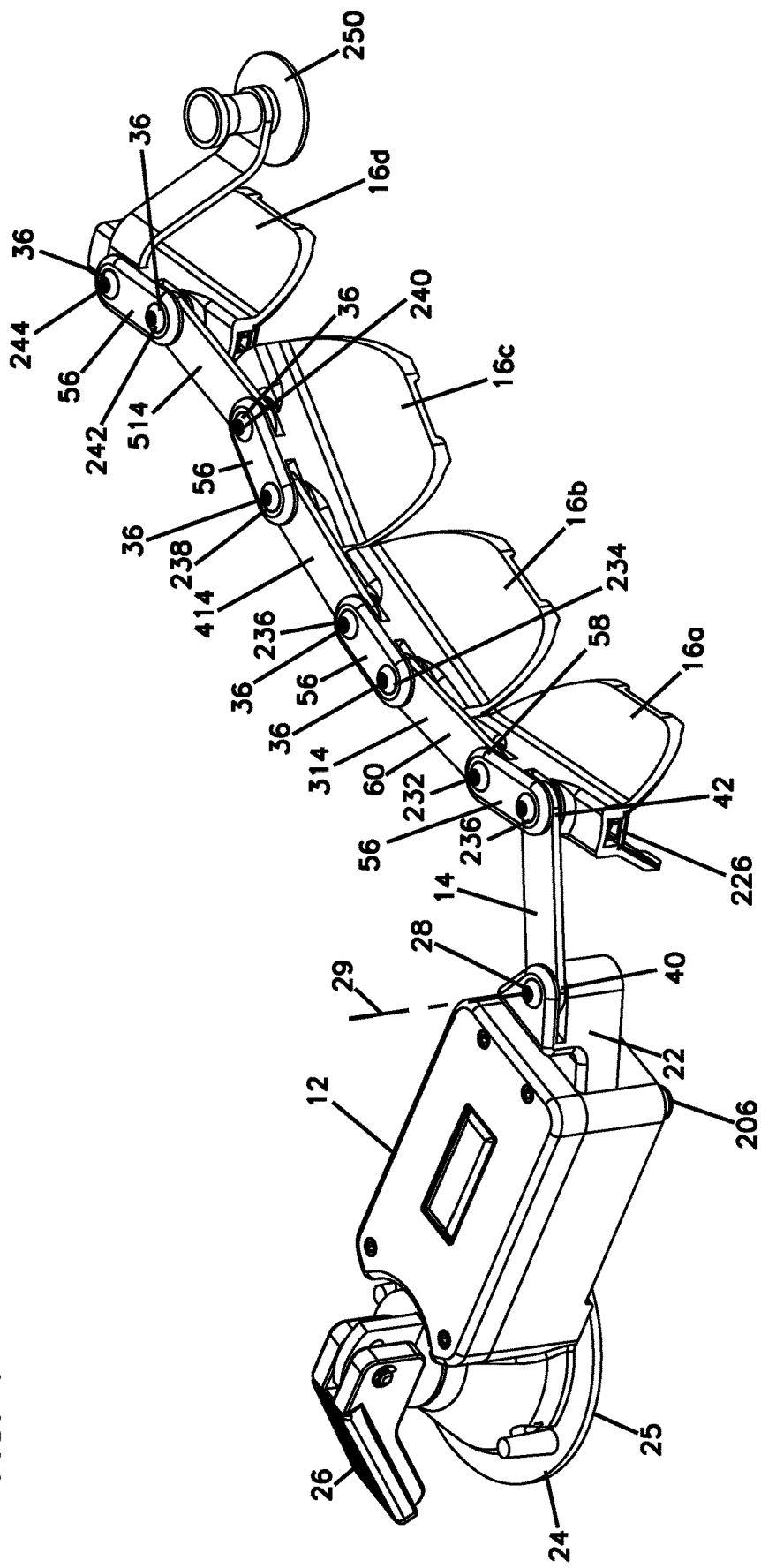
FIG. 7 is a top perspective view of the curing lamp apparatus of FIG. 1 in a second curved linear position.

FIG. 7 shows lamp apparatus 10 in a second curved linear position for repairing a differently curved crack.

Figure 8:
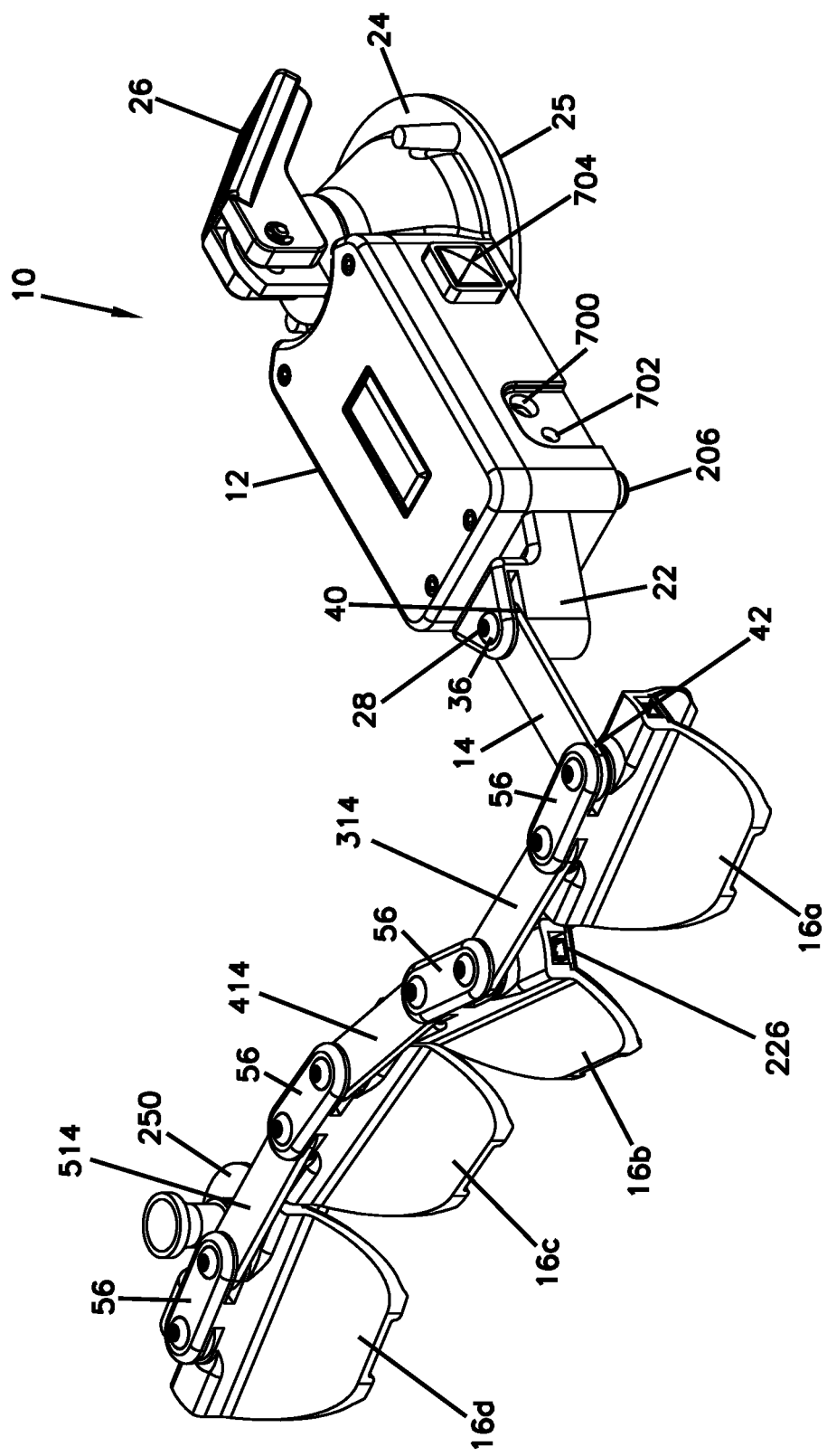
FIG. 8 is a top perspective view of the curing lamp apparatus of FIG. 1 in a third curved linear position.
Figure 9:
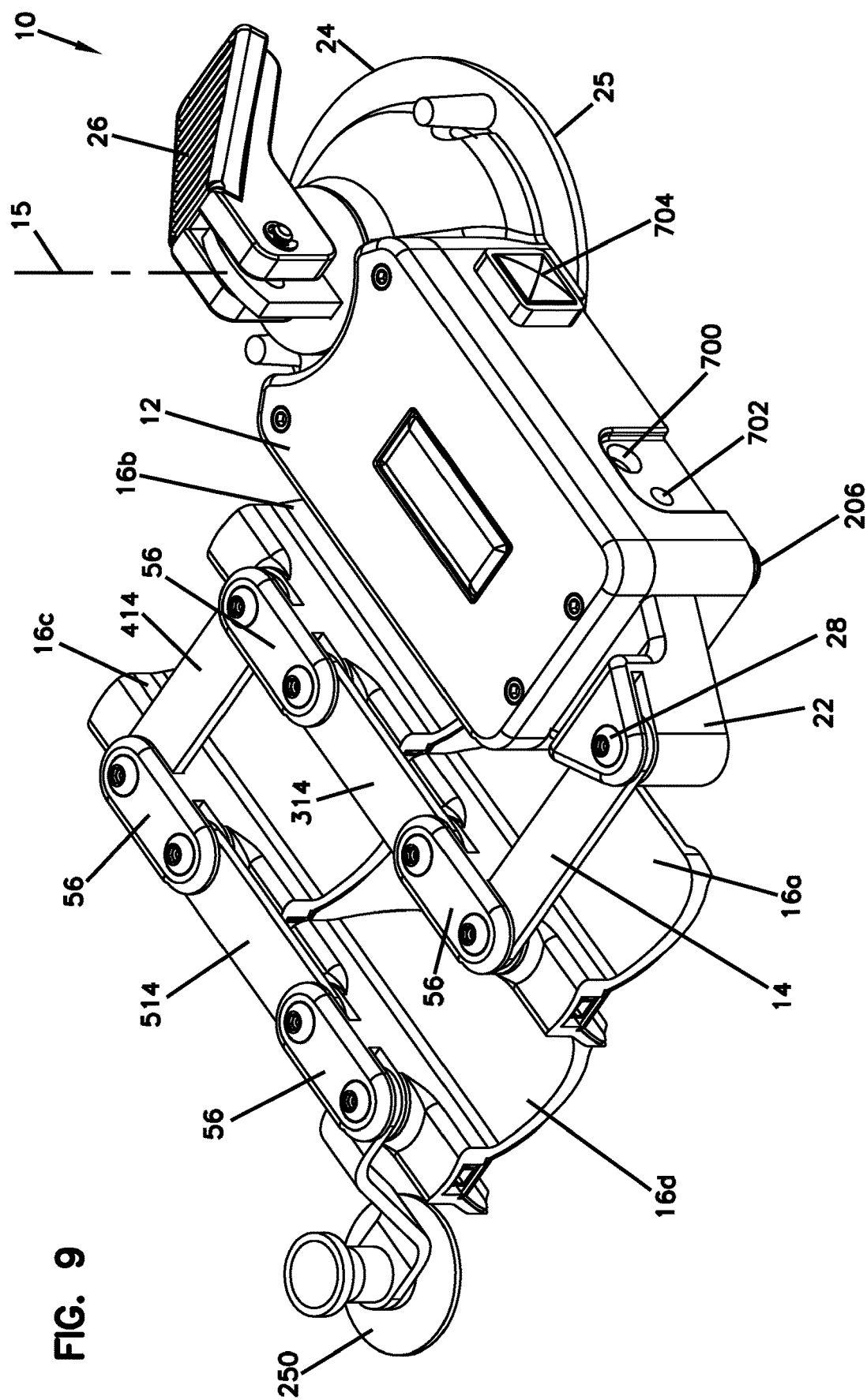
FIG. 9 is a top perspective view of the curing lamp apparatus in a storage position.
Figure 10:
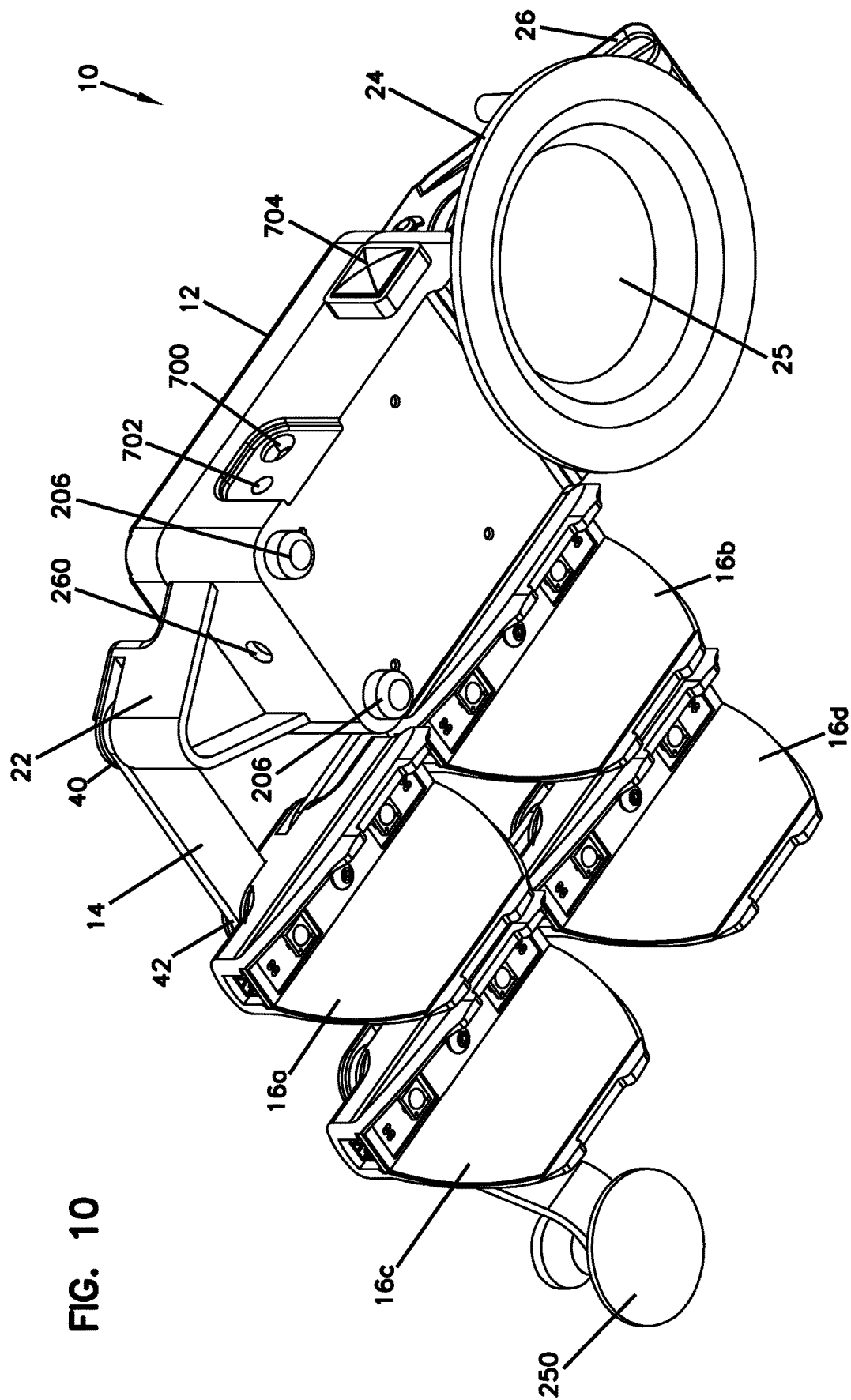
FIG. 10 is a bottom perspective view of the curing lamp apparatus in the storage position.
Figure 11:
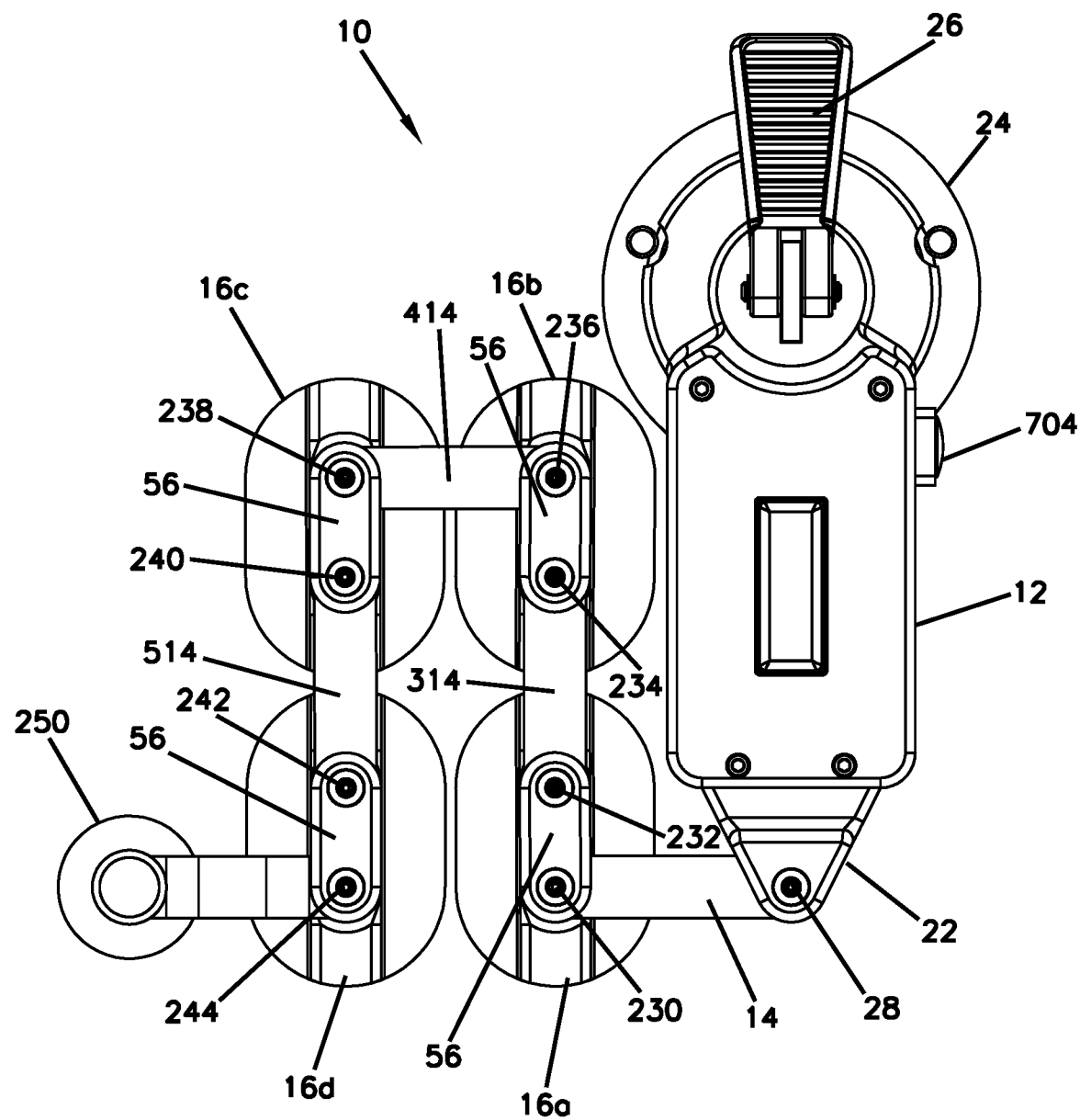
FIG. 11 is a top view of the curing lamp apparatus in the storage position.

FIG. 8 shows lamp apparatus 10 in a third curved linear position for repairing a further differently curved crack.

Each lamp element 16a-d includes a PC board 220 and at least one UV LED module 222 which together form a UV LED PC board assembly 224. As shown, each lamp element 16a-d includes two UV LED modules 222. Electrical connector sockets 226 at opposite ends allow for powering of each of the UV LED PC board assemblies 224.

In one embodiment, each of these UV LED PC board assemblies 224 is connected by a flexible two-wire assembly 227 with connector plugs 229 at both ends. The flexible two-wire assemblies 227 are used to connect each of the four UV LED PC board assemblies of the lamp elements 16a-d in a serial arrangement. In some arrangements, the wires can be coiled to maintain them in an organized manner.

A two-wire assembly 228 connects the driver circuit board 200 and passes through a hole 260 in the base 12 to the first UV LED PC board assembly 224 in the first lamp element 16a.

In one embodiment, the driver circuit board 200 is powered by a rechargeable lithium ion three-cell 11.1 volt battery 204.

On the end lamp segment there is a distal suction cup 250 to help keep the line of segments stable and in their arranged positions. Suction cup 250 includes an arm 252 and a handle 254.

After the crack repair is completed, the lamp elements 16 are folded up in a storage position to be able to store the lamp assembly in a tool box or on a shelf.

In use, lamp apparatus 10 is attached to the windshield 11 by first suction cup 24. After the cup is attached to the glass, a suction cup lever 26 is flipped downward to set the suction cup securely to the windshield. In the illustrated embodiment, there are two rubber bumpers 206 on the underside of the base, opposite the suction cup providing protective support for the base on the windshield.

The second suction cup 250 attached to the end lamp element 16d is set after the segments are arranged to align with the shape of the crack.

The lamp apparatus 10 includes a charger port 700 that connects to the side of the lamp housing. An indicator light 702 on the battery charger changes from red to green when the battery is fully charged.

Base 12 includes a bottom 650 and a cover 652. First suction cup 24 includes a mounting post 666 connected to suction cup lever 26. A suction cup cover 668 is positioned over first suction cup 24.

To operate the lamp apparatus 10 once it is in position, the momentary start switch 704 is depressed for at least one second and the lamp apparatus 10 will operate for five minutes and shut off automatically. The indicator light next to the charging receptacle in the lamp housing will indicate a low battery when the light comes on and stays on. When this indicator is blinking, it indicates the driver circuit is in the 20-minute mode. This mode is achieved by pushing and holding the start button until the indicator light begins to blink and then the start switch is released. The lamp will stay on for 20 minutes and turn off automatically. The 5 minute cure cycle is used about 95% of the time. On occasion there may be times that the technician wants to cure a break longer and the second time is set at 20 minutes. The technician can just let it run out or shut it off after the resin is cured.

The segment height is high enough for the two LEDs in each segment to intersect with each other and the LEDs in the adjacent segments, to provide a consistent line of UV light coverage over the crack being repaired.

Each lamp element 16 includes main housing 600, and an interior reflector 602. First links 14, 314, 414, 514 connect each lamp segment or element to an adjacent lamp segment or element. Second links 56 connect in a pivotal manner to the first links.

In one preferred embodiment the shape of the reflecting sides of the interior reflector is in the form of a mirrored aluminum element 602 defining a 60-degree angle between main sides.

Referring now to FIGS. 9-13, lamp apparatus 10 is shown in a folded position, such as for storage or transport. In the folded position, lamp elements 16 are positioned in two rows parallel to each other and base 12 due to the various hinge points. Other folded up storage positions are possible.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A curing lamp apparatus for mounting to a work surface comprising:
    a suction cup defining a longitudinal axis perpendicular to a suction cup surface engageable with the work surface;
    a base mounted to the suction cup;
    a first bar having a proximal end hingedly mounted to the base and a distal end extending from the base, and further defining a first hinge point between the base and the proximal end of the bar;
    a first lamp element hingedly mounted to the distal end of the first bar and defining a second hinge point, and further defining a third hinge point between the first lamp element and a second bar;
    a second lamp element hingedly mounted to a distal end of the second bar to form a line of lamp elements.

2. The curing lamp apparatus of claim 1, further comprising a third bar hingedly mounted to the second lamp element, and a third lamp element hingedly mounted to a distal end of the third bar to form a longer line of lamp elements.

3. The curing lamp apparatus of claim 2, further comprising a fourth bar hingedly mounted to the third lamp element, and a fourth lamp element hingedly mounted to a distal end of the fourth bar to form a still longer line of lamp elements.

4. The curing lamp apparatus of claim 3, further comprising a second suction cup mounted to an end of the line of lamp elements.

5. The curing lamp apparatus of claim 1, further defining a fourth hinge point between the second distal end of the second bar and the second lamp element.

6. The curing lamp apparatus of claim 1, further comprising a second suction cup mounted to an end of the line of lamp elements.

7. The curing lamp apparatus of claim 1, wherein each lamp element includes a UV LED PC board assembly connectable to an adjacent UV LED PC board assembly of further lamp element.

8. The curing lamp apparatus of claim 1, wherein each of the lamp elements include:
    a PCB;
    a light source.

9. A curing lamp apparatus for mounting to a work surface comprising:
    a suction cup defining a longitudinal axis perpendicular to a suction cup surface engageable with the work surface;
    a base mounted to the suction cup;
    a bar having first and second ends, wherein the first end is mounted to the base, and the second end defines a distal end spaced from the base;
    a first lamp element hingedly mounted at a proximal end to the distal end of the bar to define a first axis parallel to the longitudinal axis;
    a second lamp element hingedly mounted at a proximal end to a distal end of the first lamp element.

10. The curing lamp apparatus of claim 9, further comprising a third lamp element hingedly mounted at a proximal end to a distal end of the second lamp element.

11. The curing lamp apparatus of claim 10, further comprising a fourth lamp element hingedly mounted at a proximal end to a distal end of the third lamp element.

12. The curing lamp apparatus of claim 11, wherein the first, second, third, and fourth lamp elements define linear light sources.

13. The curing lamp apparatus of claim 10, wherein the first, second, and third lamp elements define linear light sources.

14. The curing lamp apparatus of claim 9, wherein the first end of the bar is hingedly mounted to the base.

15. The curing lamp apparatus of claim 9, wherein the first and second lamp elements define linear light sources.

16. The curing lamp apparatus of claim 9, further comprising a second suction cup mounted to an end of a last lamp element of a line of the lamp elements, distal from the base.

\* \* \* \* \*